United States Patent [19]

Timmerman

[11] Patent Number: 5,024,556
[45] Date of Patent: Jun. 18, 1991

[54] SYSTEM FOR ENHANCED DESTRUCTION OF HAZARDOUS WASTES BY IN SITU VITRIFICATION OF SOIL

[75] Inventor: Craig L. Timmerman, Richland, Wash.

[73] Assignee: Battelle Memorial Institute, Richland, Wash.

[21] Appl. No.: 446,384

[22] Filed: Dec. 5, 1989

Related U.S. Application Data

[63] Continuation-in-part of Ser. No. 255,057, Oct. 7, 1988, Pat. No. 4,956,535, which is a continuation-in-part of Ser. No. 60,253, Jun. 8, 1987, abandoned.

[51] Int. Cl.$^5$ .............................................. F02D 3/00
[52] U.S. Cl. ..................................... 405/128; 405/129; 405/258
[58] Field of Search ............... 405/128, 129, 258, 131, 405/303; 166/248, 11, 42; 299/14; 175/16; 404/79; 219/10.81; 252/626, 633

[56] References Cited

U.S. PATENT DOCUMENTS 4,376,598  3/1983  Brouns et al. ............... 405/129 X
4,957,393  9/1990  Buelt et al. ..................... 405/128

FOREIGN PATENT DOCUMENTS 1320921  2/1963  France ........................ 405/258
0914716  3/1982  U.S.S.R. ..................... 405/258
1143803  3/1985  U.S.S.R. ..................... 405/258

Primary Examiner—Dennis L. Taylor
Attorney, Agent, or Firm—Dellett, Smith-Hill and Bedell

[57] ABSTRACT

The present invention comprises a system for promoting the destruction of volatile and/or hazardous contaminants present in waste materials during in situ vitrification processes. In accordance with the present invention, a cold cap (46) comprising a cohesive layer of resolidified material is formed over the mass of liquefied soil and waste (40) present between and adjacent to the electrodes (10, 12, 14, 16) during the vitrification process. This layer acts as a barrier to the upward migration of any volatile type materials thereby increasing their residence time in proximity to the heated material. The degree of destruction of volatile and/or hazardous contaminants by pyrolysis is thereby improved during the course of the vitrification procedure.

12 Claims, 3 Drawing Sheets

SYSTEM FOR ENHANCED DESTRUCTION OF HAZARDOUS WASTES BY IN SITU VITRIFICATION OF SOIL

This application is a continuation-in-part of application Ser. No. 255,057 filed Oct. 7, 1988, now U.S. Pat. No. 4,956,535 which was a continuation-in-part of application Ser. No. 60,253 filed June 8, 1987, now abandoned.

BACKGROUND OF THE INVENTION

The present invention relates to a method and apparatus for accomplishing in situ vitrification of soil and waste materials and particularly to such a method and apparatus as promotes the formation and maintenance of a useful cold cap layer.

The presence of waste or contaminated material buried in the ground is a subject of concern relative to possible dispersion of the waste and contamination of the surrounding environment. Various methods have been employed for stabilizing or solidifying waste sites, for example, the injection of soil reactant chemicals or solidifying compositions of material such as concrete. Stabilization has also been accomplished by artificially freezing the soil.

A particularly attractive method for solidifying or destroying hazardous waste material in situ and for general soil stabilization is described and claimed in Brouns et al U.S. Pat. No. 4,376,598 entitled "In Situ Vitrification of Soil", issued Mar. 15, 1983. According to this method, two or more electrodes are placed in the ground and after a start-up procedure a substantial current is passed therebetween resulting in liquification or melting of the soil. The waste materials will be melted, pyrolyzed or dissolved in the molten soil. A gas collection apparatus is placed over the site for removing gaseous products of combustion. After melting, the current flow is discontinued whereupon the liquefied mass hardens into vitrified material comprising for the most part a glass, a glass ceramic or a partially devitrified glass, having crystals and glass dispersed in a solid matrix composed primarily of silica and alumina materials. Any metals within the mass may be dissolved in the glass especially as oxides, or may form accumulations at its lower boundaries.

According to this procedure, the soil undergoing treatment reduces somewhat in bulk and "subsides" leaving a depressed area or pocket which may then be backfilled to the original ground surface further burying the solidified waste material. This mode of operation is achieved, for example, when employing electrodes exhibiting high electrical and heat conductivity such as graphite electrodes which promote subsidence of the soil surface.

However, subsidence of the surface is not always desirable since it may allow the ready escape of volatile and/or hazardous materials as may be contained in organic waste materials.

It is therefore an object of the present invention to increase the residence time of volatile and/or hazardous materials in and around the electrodes and the liquefied material in an in-situ vitrification process in order to promote their complete destruction by pyrolysis.

It is another object of the present invention to employ the natural materials available in forming a structure useful in promoting the destruction of organic type volatile and/or hazardous materials during in situ vitrification of soil and waste materials.

It is a further object of the present invention to promote the destruction of organic type volatile and/or hazardous materials without fundamentally altering the basic steps for the in situ vitrification of waste materials.

SUMMARY OF THE INVENTION

The present invention relates to a system for the in situ vitrification of soil containing organic waste material, which system promotes the destruction of volatile and/or hazardous components such as solvents, pesticides and the like. In accordance with the system, two or more electrodes are inserted into the soil surrounding the waste, and an electrical current is passed through the soil and waste material between the electrodes in order to heat and liquefy the soil and waste. I have discovered that under suitable electrical and thermal conditions, a cohesive layer of solid material is advantageously formed and maintained in bridged relation between the aforementioned electrodes. This body of resolidified soil and waste material, termed a "cold cap", is supported over the mass of liquefied soil and waste. The cold cap of resolidified material may enhance pyrolysis and fixation of volatile and/or hazardous material within the waste by increasing their residence time within an area of elevated temperature associated with the liquefied materials existing between and adjacent to the electrodes.

In the preferred embodiment, current is initially passed between the electrodes at a comparatively low power level in order to preferentially promote the formation of the cold cap during the first stages of the process of liquefaction of the soil and waste materials. Additionally, molybdenum shafts are employed as the electrodes since, in addition to resisting chemical corrosion, the molybdenum adheres well with the soil materials, thereby allowing the shafts to support and assist in the formation of the cold cap layer. Further, a chamber is formed in between the cold cap of resolidified matter and the mass of liquefied soil and waste material comprising a vacuous zone in which off-gases and other volatile and/or hazardous waste materials may accumulate while being subject to pyrolysis due to the effects of the elevated temperatures in this zone.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
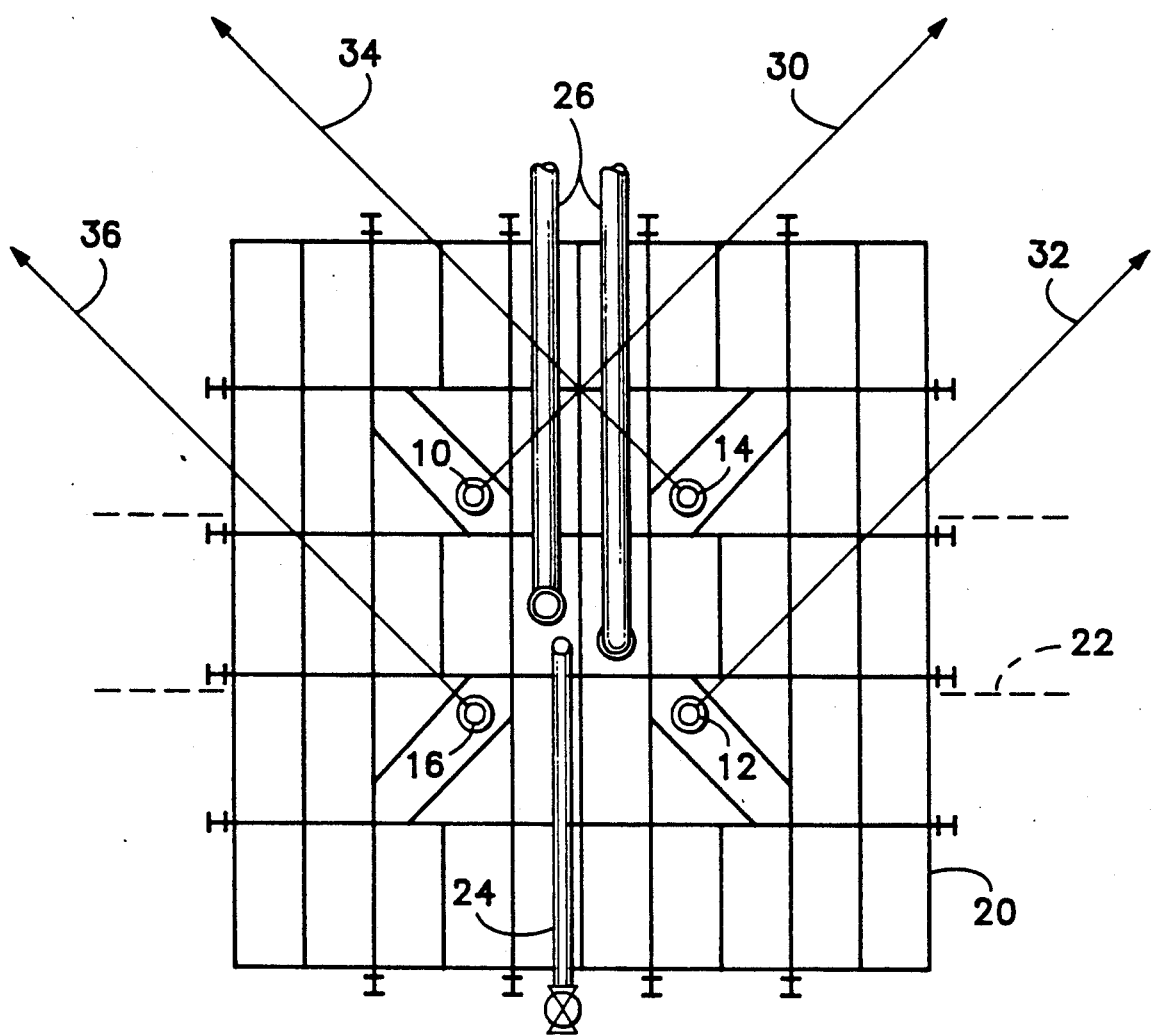
FIG. 1 is a top view of in situ vitrification hood apparatus.
Figure 2:
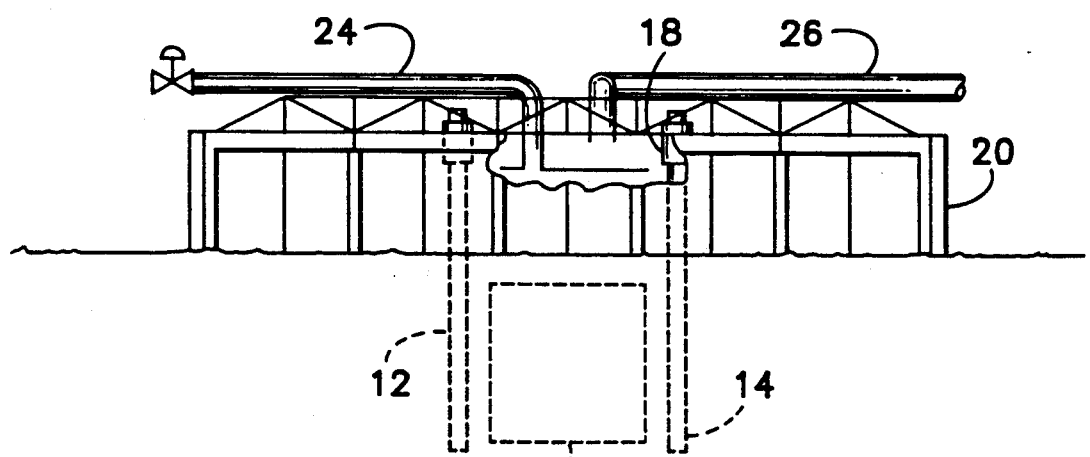
FIG. 2 is a side view of the apparatus shown in FIG. 1.

Referring to the drawings and particularly to FIGS. 1 and 2 illustrating an in situ vitrification apparatus, a plurality of substantially vertically disposed electrodes, 10, 12, 14 and 16 are supported via insulating feedthroughs 18 from the roof of a portable hood 20. The electrodes 10, 12, 14 and 16 are adapted for resistance to corrosion and oxidation and for adherence with vitreous soil for reasons which will be hereinafter explained and therefore comprise molybdenum shafts in the range of 1-3 inches in diameter and 15-20 feet in length. Hood 20, which is typically about twelve to eighteen meters square by two meters high, is movable with respect to the ground and may be placed over a section of buried trench or the like 22 containing waste including especially organic materials which may be of a volatile or hazardous character such as paints, inks, contaminated solvents, heavy metals, pesticides, herbicides, plating solutions, pickle liquors, explosives or the like. The hood is also equipped with a combustion air inlet system 24 and off-gas outlets 26 connected with the top interior of the hood. The off-gas outlets lead to a suitable gas treating or scrubbing system (not shown).

The electrodes 10-16 are either driven into the ground or otherwise inserted into the ground, for example in pre-drilled holes, at locations surrounding or within the underground area containing the waste materials. First electrodes 10 and 12 on opposite sides of the trench are connected via conductors 30 and 32 respectively to a first phase of current, while second electrodes 14 and 16, also disposed on opposite sides of the trench, are connected by way of conductors 34 and 36 respectively to a second phase of current. The conductors 30-36 may be joined to the respective electrodes by connector clamps (not shown). The apparatus is electrically supplied by way of a transportable power substation (also not shown) delivering three-phase power to transformers in a Scott-tee connection for providing two-phase current to conductors 30-32 and 34-36, respectively. Adjustable means may be included for determining the desired voltage and current levels. A load voltage between approximately 4000 and 400 volts is suitably supplied with a corresponding current capacity on each of the two phases of between 450 and 4000 amps. In tests, a final voltage on the order of 700 to 600 volts delivering a current between 2000 and 3000 amperes has been employed for soil melting, but lower levels are initially utilized in accordance with the present invention.

Figure 3:
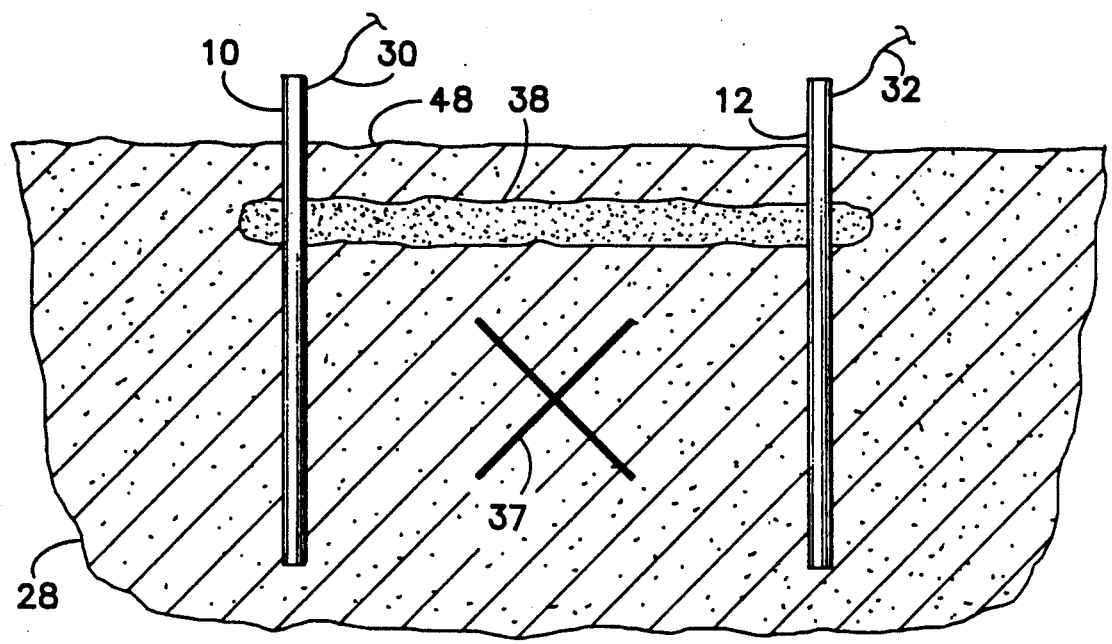
FIG. 3 is a side view illustrating preparation of a soil area for vitrification.
Figure 4:
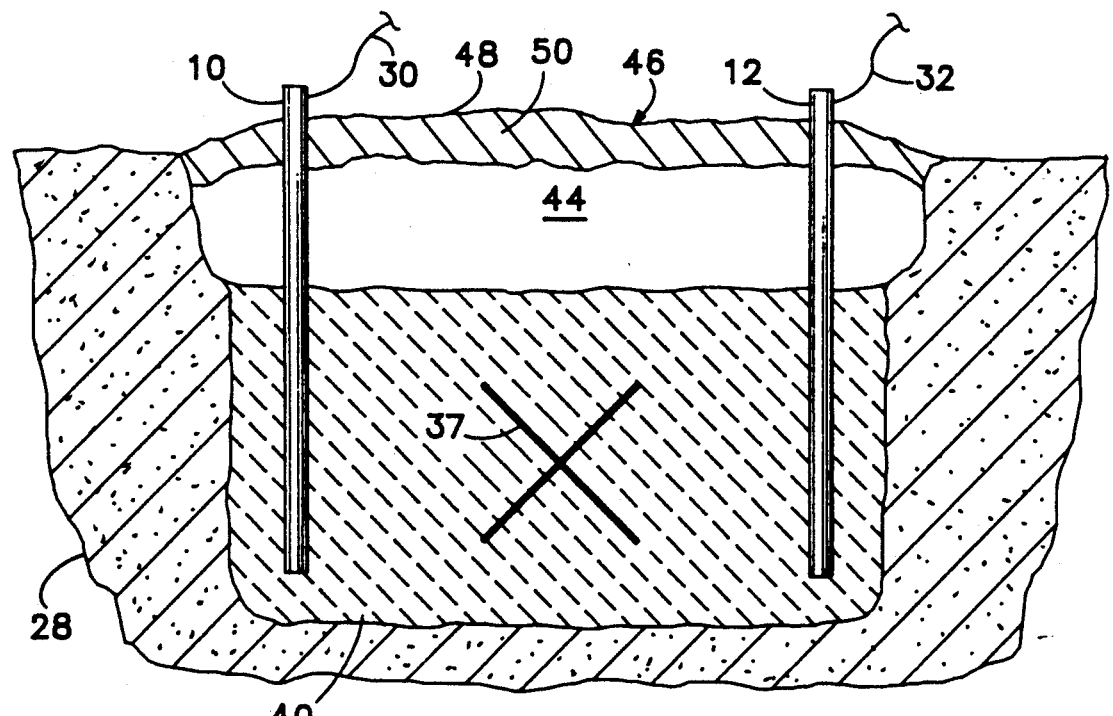
FIG. 4 is a side view illustrating a vitrification zone and the formation of a cold cap.
Figure 5:
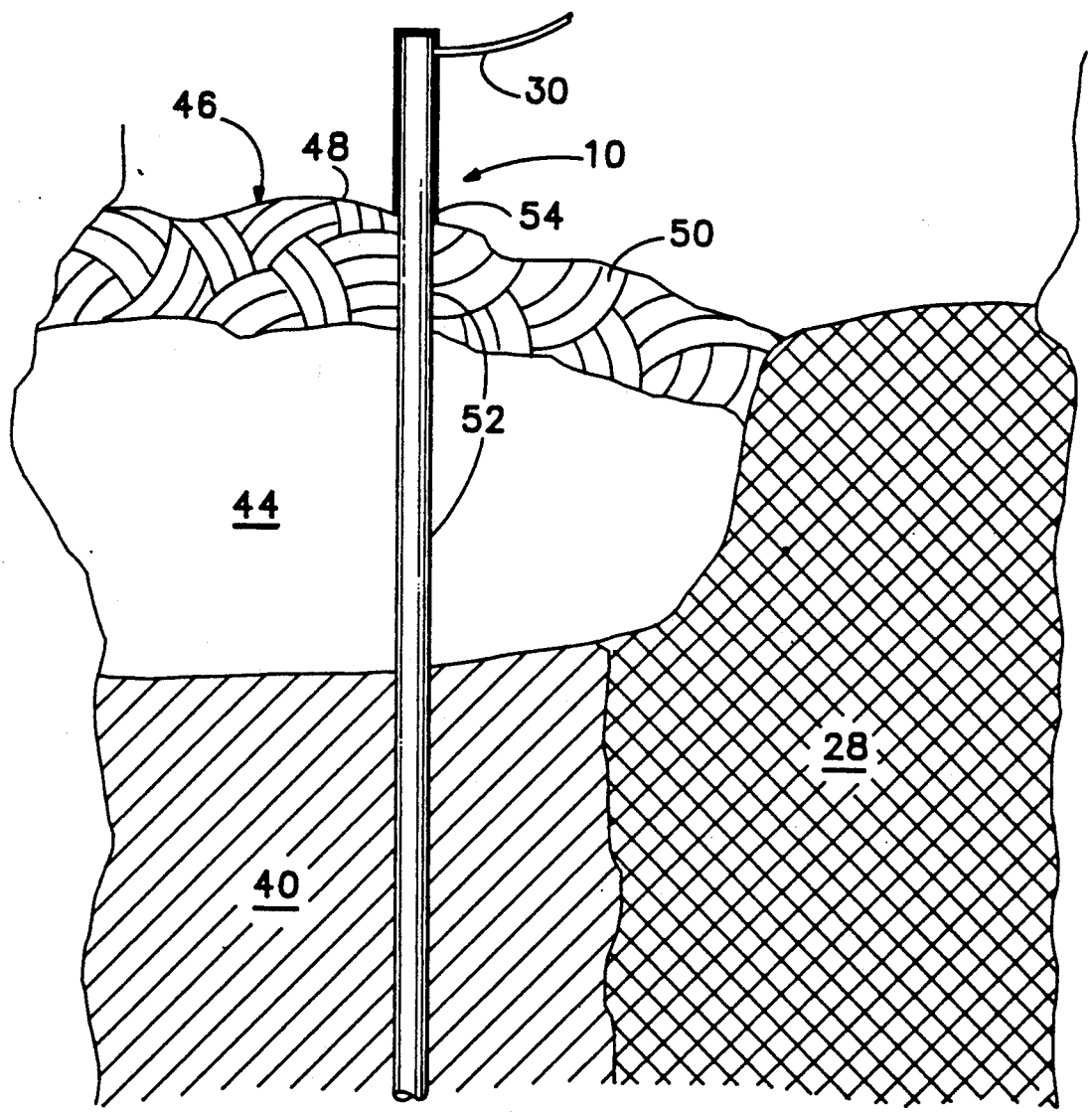
FIG. 5 is a cross-sectional view of one of the electrodes in accordance with the present invention having cold cap material adhered thereto.

The in situ vitrification method is schematically illustrated further in FIGS. 3 through 5. Electrodes 10 and 12 are suitably disposed vertically on either side of or within a region of buried waste material the general location of which is represented by the large ×37. For starting the soil melting process, a horizontal layer 38 of graphite and glass frit may be buried several inches below the surface of the ground over the waste material and placed between the two electrodes in contacting relation therewith. A voltage of a few hundred volts is applied between conductors 30 and 32 causing conduction through layer 38 and causing an elevation in the temperature for melting the glass frit component and the portion of the soil 28 immediately therearound. As illustrated in FIG. 4, a current carrying liquid glass pool 40 is established which progressively enlarges over a period of 30-50 hours extending both laterally and vertically downward, gradually engulfing the waste materials. The waste materials will be melted, pyrolyzed or dissolved in the molten mass. Metals within the mass may be dissolved or may eventually be found as solid portions at the lower boundary of the glass pool 40. When the glass pool 40 reaches a desired depth, current flow is discontinued and the pool cools to form a vitrified mass as a glass, a glass ceramic, or a partially devitrified glass, with crystals and glass dispersed within a solid matrix of alumina and silica.

It has been discovered that a layer 46 (in FIG. 4) of refrozen matter termed a "cold cap", typically from one half to two feet thick, can be formed over the pool 40 of liquefied soil and waste material. The layer 46 is comprised of soil and waste material 50 which may have risen to the surface 48 during the initial stages of the vitrification process, and which then resolidifies into a cohesive layer as it accumulates at the surface 48 and as the material therebelow subsides. The layer 46 has a porous structure due to large numbers of gas bubbles trapped at and near the surface 48 as the material 50 forming a layer 46 resolidifies. The porous nature of the layer 46 is believed to assist in arresting current flow through this layer as might otherwise lead to remelting and to improve its thermal insulating characteristics. It should be noted that while the layer 46 may be referred to as porous it is primarily a closed cell structure and is of assistance in retarding the release of volatile materials transferring upward from the pool 40 of liquefied material therebelow. As the pool 40 enlarges, densifies and subsides a chamber 44 comprising a vacuous zone is formed between the pool 40 and the cold cap layer 46. This zone will typically be from 2-6 feet in depth and constitutes an enclosed area evacuated of solid materials in which volatile materials from the waste may usefully collect.

In practice, the layer 46 forms at the surface 48 and is bridged between and extends around the electrodes 10 and 12. The vitreous soil adheres to the molybdenum surfaces 52 of the electrodes, and the electrodes 10 and 12 thereby assist in supporting the cold cap. The layer 46 comprising the cold cap covers the pool 40 of liquefied material joining with the soil 28 along its perimeter around the boundary of the area occupied by the pool 40. The cold cap functions to seal the surface 48 by slowing diffusion of any "volatile type" materials. For the purposes of this application, such volatile materials include any contaminants which may migrate upward as a result of vaporization, capillary action, pressure or concentration gradients or other transport mechanisms. The residence time of volatile and/or hazardous contaminants such as pesticides, paints, adulterated solvents, heavy metals, explosives, and the like within the heated area of elevated temperature (i.e., approaching 1800° C.) in and around the pool 40 of liquefied material is thereby substantially increased. This increase in residence time helps to assure the thermal destruction and/or fixation of such hazardous materials by pyrolysis processes.

It should be noted that the molybdenum electrodes 10-16 are an important factor in forming the cold cap since, in contrast to graphite type electrodes preferred for other purposes, vitreous soil adheres to the surfaces of molybdenum electrodes thereby allowing the electrodes to support the layer 46 in order to help prevent it from falling into the liquefied material. Further, the chamber 44 is important in providing an area in which volatile materials as previously defined can collect while still being subject to the elevated temperatures characteristic of the molten material. Such action by the chamber 44 is advanced by the physical barrier effect and the thermal insulating action of the layer 46.

In order to promote the formation of cold caps, electrical and thermal conditions favorable to the formation and maintenance of a cohesive layer 46 of material 50 bridged between the electrodes 10 and 12 should be generated and maintained. This may be primarily accomplished by dividing the vitrification procedure into two stages. In the first stage, operations are undertaken for a period of time at comparatively low power levels. Power levels are reduced by approximately 50% from the levels ordinarily employed during vitrification procedures when cold caps are not desired, and applied over a period which may last between 5-10 hours. For example, using the apparatus shown in FIGS. 1 and 2, the preferred power levels during the first stage should fall within the range of 800-1000 Kwatts per phase (while subsequent power levels would ordinarily range between 1400-1800 Kwatts). These reduced initial levels of power help to preferentially promote the accumulation and resolidification of material at the surface 48 between and around the electrodes 10 and 12 in order to form a layer 46 having a sufficient depth in the range of at least 6-12 inches. The second stage may then be undertaken at higher or "full" power whereby the soil and waste material can be fully liquefied in accordance with the other considerations of the vitrification process.

It should be noted in this regard that the cold cap layer 46 may then allow full liquefaction of the desired soil and waste material either with greater speed, or at lower power levels due to its thermal insulating characteristics which help retain the heat generated by the current flow within the pool 40. In any case, it should further be noted that other than unlimited power levels should be maintained as the vitrification process proceeds in order to avoid remelting of the layer 46. Using the apparatus shown in FIGS. 1 and 2, preferred power levels (during the second stage of operation) would generally fall within the range of 1600-1800 Kwatts per phase during the vitrification process and generally not to exceed 1875 Kwatts per phase.

Referring particularly to FIG. 5, a molybdenum electrode 12 is shown which has a diameter of approximately 2 inches and length of approximately 18 feet. The electrode 12 comprises a molybdenum shaft, which is coated with a layer 54 of molybdenum disilicide or zirconium diboride at least above the level of the soil surface 48, the layer being flame-sprayed or fused on the shaft. This coating layer 54 helps resist oxidation of the molybdenum in contact with the atmosphere above the melt under high temperature conditions. While such coating can extend somewhat below the melt surface, the molybdenum electrode is otherwise uncovered by any tube or sheath as would prevent the interaction of the melt and the molybdenum electrode at the surface of the melt in order to promote the formation, maintenance and support of the cold cap. The vitreous soil and waste material 50 in the cold cap layer 46 adhere to the surface 52 due to the natural affinity between this type of glass and molybdenum, and due to the reduced temperature of the electrode 12 at the level of the layer 46, resulting from the distance from the layer 46 to the pool 40 and limited diameter of the electrode 12 which diminish upward heat conduction in the electrode.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for in situ vitrification of soil (28) containing organic waste material, comprising the steps of:
    inserting two or more electrodes (10, 12, 14, 16), having surface compositions adapted for adherence with liquefied soil materials, into the soil at spaced apart locations so as to span at least a portion of said waste material;
    passing an electrical current through said soil and waste material along an electrically conductive resistance path (38) between said electrodes by applying a voltage across said electrodes in order to heat and liquefy said soil and waste material between and adjacent said electrodes;
    pyrolyzing volatile contaminants within said waste material by increasing their residence time within the heated area between and adjacent said electrodes by forming and maintaining a cold cap structure (46) of resolidified soil and waste material (50) over said liquefied soil and waste material (40) during continued passage of current between said electrodes; and
    terminating the application of voltage to the electrodes in order to discontinue the flow of said current and permit cooling and solidification of the melted soil and waste material into a densified mass.

2. The process of claim 1 further including:
    initially passing a current along said electrically conductive path between said electrodes (10, 12, 14, 16) through said soil and waste material at a comparatively low first power level in order to preferentially promote the formation of said cold cap during first stages of the process of liquification of said soil.

3. The process of claim 1 wherein said electrodes (10, 12, 14, 16) comprise molybdenum shafts having diameters in the range of approximately 1-3 inches.

4. The process of claim 3 wherein said molybdenum shafts have an oxidation-resistant coating (54) above the level at which they are to be contacted by the surface of the soil.

5. In a process for in situ vitrification of soil (28) containing waste materials including the steps of inserting electrodes (10, 12, 14, 16) into said soil and waste material and passing an electrical current through said soil and waste material in order to form a melt of said soil and waste material, the improvement comprising the step of: enhancing the pyrolysis and fixation of volatile material within said waste materials by:
    a) employing electrodes (10, 12, 14, 16) having exterior compositions at the surface of the melt adapted for adherence with liquefied soil materials at or near the original soil surface, and
    b) forming a cold cap (46) of resolidified matter over said soil and waste material by controlling the passage of said current at a level promoting formation of a cohesive layer of solid material (50) bridged between said electrodes as opposed to melting said layer, in order to increase the residence time of said volatile material within the heated area between and adjacent said electrodes.

6. The process of claim 5 wherein said electrodes (10, 12, 14, 16) comprise molybdenum shafts having diameters in the range of approximately 1-3 inches.

7. A method for in situ vitrification of soil (28) containing organic waste material deposited therein, comprising the steps of:
   inserting two or more electrodes (10, 12, 14, 16) having surface compositions adapted for adherence with liquefied soil materials into the soil at spaced apart locations so as to span at least a portion of said waste material;
   forming a cold cap (46) of resolidified material (50) over said soil and waste material by initially passing a current along an electrically conductive path (38) between said electrodes through said soil and waste material at a power level low enough to promote the formation of resolidified matter between and around said electrodes;
   passing an electrical current through said soil and waste material along said electrically conductive resistance path between said electrodes at a higher power level in order to heat and liquefy said soil and waste material between and adjacent said electrodes while maintaining said cold cap of resolidified soil and waste material over said liquefied soil and waste material, said cold cap functioning to promote the pyrolysis and fixation of any volatile materials within said waste material by enhancing their residence time within the heated area between and adjacent to said electrodes; and
   terminating the application of current to the electrodes to permit cooling and solidification of the melted soil and waste material into a densified mass.

8. The process of claim 7 wherein said electrodes (10, 12, 14, 16) comprise molybdenum shafts having diameters in the range of approximately 1-3 inches.

9. A structure for use in a process for the in situ vitrification of soil (28) including organic waste material comprising the steps of inserting electrodes (10, 12, 14, 16) into said soil and passing an electrical current through said soil and waste material in order to liquefy the same, said structure including:
   a) a mass of liquefied and partially liquefied soil and waste material (40) resident between and around said electrodes; and
   b) a cold cap (46) of solid matter covering said mass of liquefied and partially liquefied soil and waste material, said cold cap comprising a cohesive layer of resolidified soil and waste material which is operative for increasing the residence time of any volatile components of said waste material within the structure as electrical current is passed through the soil and waste material.

10. The structure of claim 9 further including
    c) a chamber (44) located between said mass of liquefied and partially liquefied material and said cold cap, said chamber comprising a vacuous zone in which off-gasses and other volatile components from said soil and waste material can reside for enhanced destruction.

11. The structure of claim 8 wherein said electrodes (10, 12, 14, 16) comprise molybdenum shafts having diameters in the range of approximately 1-3 inches.

12. The structure of claim 11 wherein said molybdenum shafts have a oxidation-resistant coating (54) above the level at which they are to be contacted by the surface of the soil.

* * * * *